(12) United States Patent
Cheney et al.

(10) Patent No.: US 9,080,693 B2
(45) Date of Patent: Jul. 14, 2015

(54) AUTOMATED SYSTEM FOR LAYING PIPE

(71) Applicants: Shaun Aird Cheney, Carpinteria, CA (US); Landan Alan Cheney, Billings, MT (US)

(72) Inventors: Shaun Aird Cheney, Carpinteria, CA (US); Landan Alan Cheney, Billings, MT (US)

(73) Assignee: Yeti Pipeline Equipment, LLC, Billings, MT (US)

( * ) Notice: Subject to any disclaimer, the term of this patent is extended or adjusted under 35 U.S.C. 154(b) by 267 days.

(21) Appl. No.: 13/645,813

(22) Filed: Oct. 5, 2012

(65) Prior Publication Data

US 2013/0129458 A1    May 23, 2013

Related U.S. Application Data

(60) Provisional application No. 61/562,295, filed on Nov. 21, 2011.

(51) Int. Cl.
*F16L 1/024* (2006.01)
*F16L 1/036* (2006.01)
*F16L 1/06* (2006.01)

(52) U.S. Cl.
CPC .............. *F16L 1/036* (2013.01); *F16L 1/0243* (2013.01); *F16L 1/065* (2013.01)

(58) Field of Classification Search
CPC .......... F16L 1/0143; F16L 1/065; F16L 1/036
USPC ............................ 414/745.4–746.3, 502, 507
See application file for complete search history.

(56) References Cited

U.S. PATENT DOCUMENTS

| | | | | |
|---|---|---|---|---|
| 505,829 A | * | 10/1893 | Hill | 414/746.2 |
| 2,780,376 A | * | 2/1957 | Sanders | 414/502 |
| 3,565,269 A | | 2/1971 | Martin | |
| 3,667,620 A | | 6/1972 | Steiro | |
| 3,706,347 A | * | 12/1972 | Brown | 175/85 |
| 3,780,883 A | * | 12/1973 | Brown | 414/22.62 |
| 3,956,901 A | * | 5/1976 | Brown | 405/184.5 |
| 4,093,082 A | * | 6/1978 | Goodsell | 414/745.5 |
| 5,358,371 A | * | 10/1994 | Neddo | 414/745.5 |
| 5,556,253 A | | 9/1996 | Rozendaal et al. | |
| 7,149,600 B2 | | 12/2006 | Rippolone | |
| 7,179,019 B2 | | 2/2007 | Seto et al. | |
| 7,458,750 B2 | | 12/2008 | Fulton | |
| 7,473,065 B2 | | 1/2009 | Wells | |
| 7,736,119 B2 | | 6/2010 | Belik | |
| 2005/0123356 A1 | * | 6/2005 | Wilkinson | 405/184.5 |
| 2005/0180821 A1 | * | 8/2005 | Wilkinson | 405/184.5 |
| 2009/0263221 A1 | | 10/2009 | Oldershaw | |
| 2010/0074689 A1 | * | 3/2010 | Lykins | 405/154.1 |
| 2013/0129458 A1 | | 5/2013 | Cheney et al. | |

OTHER PUBLICATIONS

International Search Authority/US; International Search Report and Written Opinion of the International Searching Authority for PCT/US14/38632; Sep. 16, 2014; pp. 1-5; International Searching Authority/US, United States.

* cited by examiner

*Primary Examiner* — Saul Rodriguez
*Assistant Examiner* — Mark Hageman
(74) *Attorney, Agent, or Firm* — Middleton Reutlinger

(57) ABSTRACT

An automated vehicle system for laying pipe includes a vehicle (e.g., a stringing trailer) with a bed for storing a plurality of pipes. Tilted gravity members extend across the bed of the vehicle to feed the pipes toward a chute with conveyor running toward the rear of the vehicle. A gate arm and rocker arm mechanism ensure that pipes are fed one at a time onto the conveyor to lay a series of pipes on the ground. Optionally, a joining trailer can be connected behind the vehicle for joining the pipes together before the pipe is placed on the ground.

11 Claims, 7 Drawing Sheets

AUTOMATED SYSTEM FOR LAYING PIPE

RELATED APPLICATION

The present application is based on and claims priority to the Applicants' U.S. Provisional Patent Application 61/562,295, entitled "Automated System For Laying Pipe," filed on Nov. 21, 2011.

BACKGROUND OF THE INVENTION

1. Field of the Invention

The present invention relates generally to the field of automated systems for laying pipe. More specifically, the present invention discloses an automated vehicle system for laying pipe on the ground or feeding pipe into a joining machine.

2. Statement of the Problem

The problem with the current process of "stringing" (offloading or laying) the pipe on the ground, and "joining" (connecting the pipe together) in a pipeline is that it is slow, dangerous, costly and sometimes impossible due to weather or terrain. Stringing pipe usually requires one person to drive a truck and two people offloading the pipe from a trailer onto the ground. After the pipe has been offloaded onto the ground, one or more persons must go back and join each pipe together. Workers must push pipe off of a flatbed trailer. Many times work must stop due to adverse weather or difficult terrain. If weather gets too difficult to work in because the trailer cannot maneuver in mud or it becomes too difficult or dangerous for workers to offload pipe in the rain or snow, work must stop. Sometimes terrain gets too steep to where neither the trailer nor the workers can continue working safely and must stop. If the weather or terrain is agreeable and pipe can be offloaded from a trailer successfully it must be picked back up with another crew of workers and moved to join the pipe together or loaded into a machine to be joined together. This process would then involve roughly five workers.

Solution to the Problem

In contrast to the prior art, the present invention provides an automated vehicle for laying pipe that requires only one or two workers. In particular, the present invention can be implemented as a string trailer that is towed by a truck or tractor. Optionally, a joining trailer can be connected to the back of the stringing trailer to create a system wherein the pipe can be joined before it touches the ground. The stringing trailer is designed to require only one worker (i.e., the driver), without the assistance of the additional workers on the ground. The driver has the option to feed the pipe into the joining trailer if the joining trailer is connected. If the joining trailer is connected, the pipe can be fed into it and joined together before the pipe exits the rear of the joining trailer and is deposited on the ground.

SUMMARY OF THE INVENTION

This invention provides an automated vehicle system for laying pipe. The system includes a vehicle (e.g., a stringing trailer) with a bed for storing a plurality of pipes. Tilted gravity members extend across the bed of the vehicle to feed the pipes toward a chute with a conveyor running toward the rear of the vehicle. A gate arm and rocker arm mechanism ensure that pipes are fed one at a time onto the conveyor to lay a series of pipes on the ground. Video is relayed to the driver via closed-circuit television to ensure proper operation of the system. Optionally, a joining trailer can be connected behind the vehicle for joining the pipes together before the pipe is placed on the ground.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
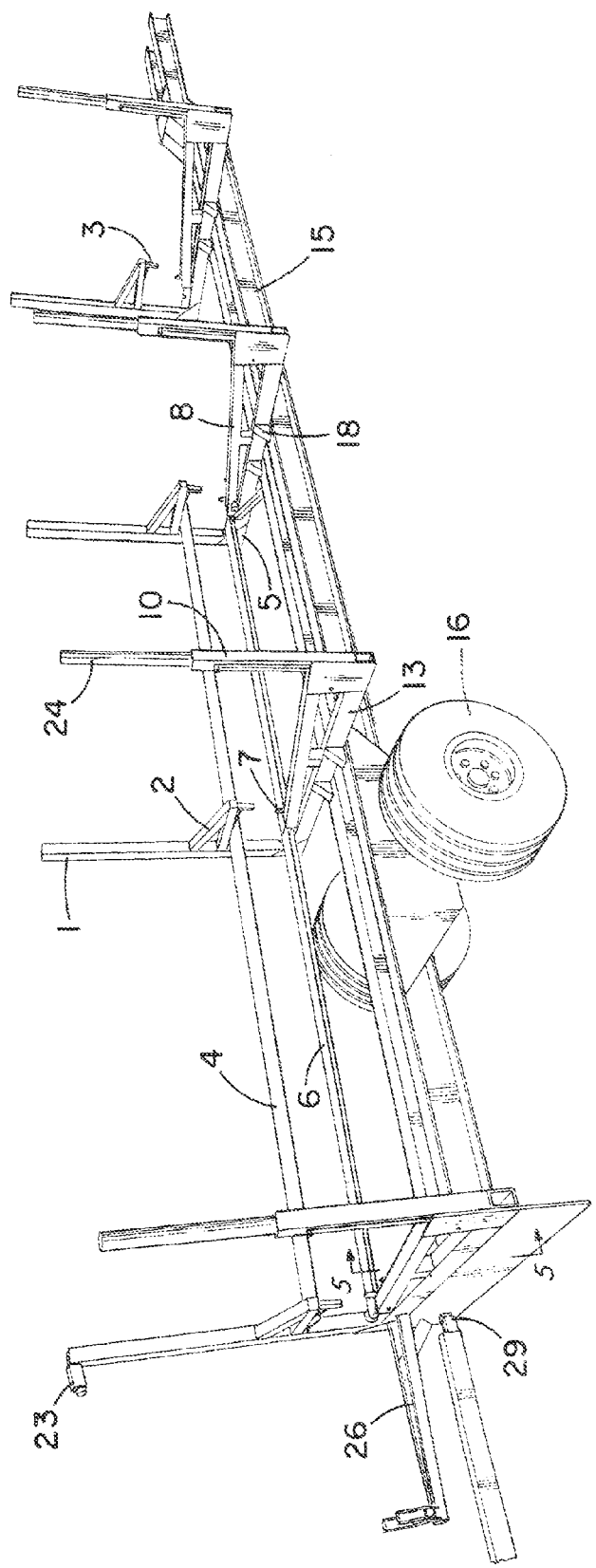
FIG. 1 is a perspective view of a stringing trailer embodying the present invention.
Figure 2:
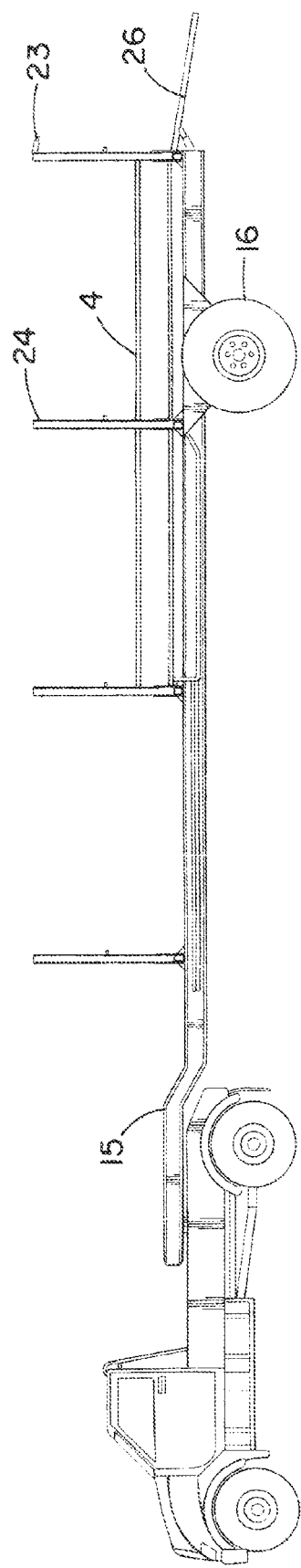
FIG. 2 is a side elevational view of the stringing trailer being towed by a truck.

The following is list of the major components of the present invention with their respective reference numbers in the accompanying drawings:

1. Fixed upright
2. Chute arm
3. Gate arm
4. Shroud
5. Support plate
6. Conveyor belt
7. Rocker arm
8. Gravity member
9. Round insert
10. Upright receiver
11. Pivot point
12. Pivot plate
13. Base
14. Receiver slot
15. Trailer frame
16. Wheel
17. Rocker actuator
18. Base support
19. Receiver slot handle
20. Spring
21. Cable
22. Chute
23. Camera
24. Assembly units
25. Adjustment pins
26. Transition cradle
27. Joining trailer
28. Doors
29. Pintle hitch
30. Sensor
31. Heater
32. Air conditioner FIGS. 1 and 2 depict an example of a stringing trailer embodying the present invention. The stringing trailer is made up of a trailer having a number (e.g., four) of modular assembly units 24 that are connected to the frame of the trailer. The first upright is attached to a slide and pin mechanism (similar to a conventional fifth wheel mechanism on a semi-trailer) allowing for travel toward a second upright, thereby allowing shorter length pipe to be used. The assembly units 24 are what hold the pipe and automatically dispense the pipe. Each assembly 24 is made up of a number of other parts which are described below. For the most part, each assembly 24 are essentially the same. The assembly units 24 are equally spaced to hold pipe. The trailer can be made as long or as short as is needed and the assembly units 24 can be spaced between. If a 50 ft. piece of pipe is used, for example, it would be best to have the assembly units 24 spaced so that the two end assembly units 24 are slightly less than 50 ft. apart. The pipe should lay inside the assembly units 24.

Figure 4:
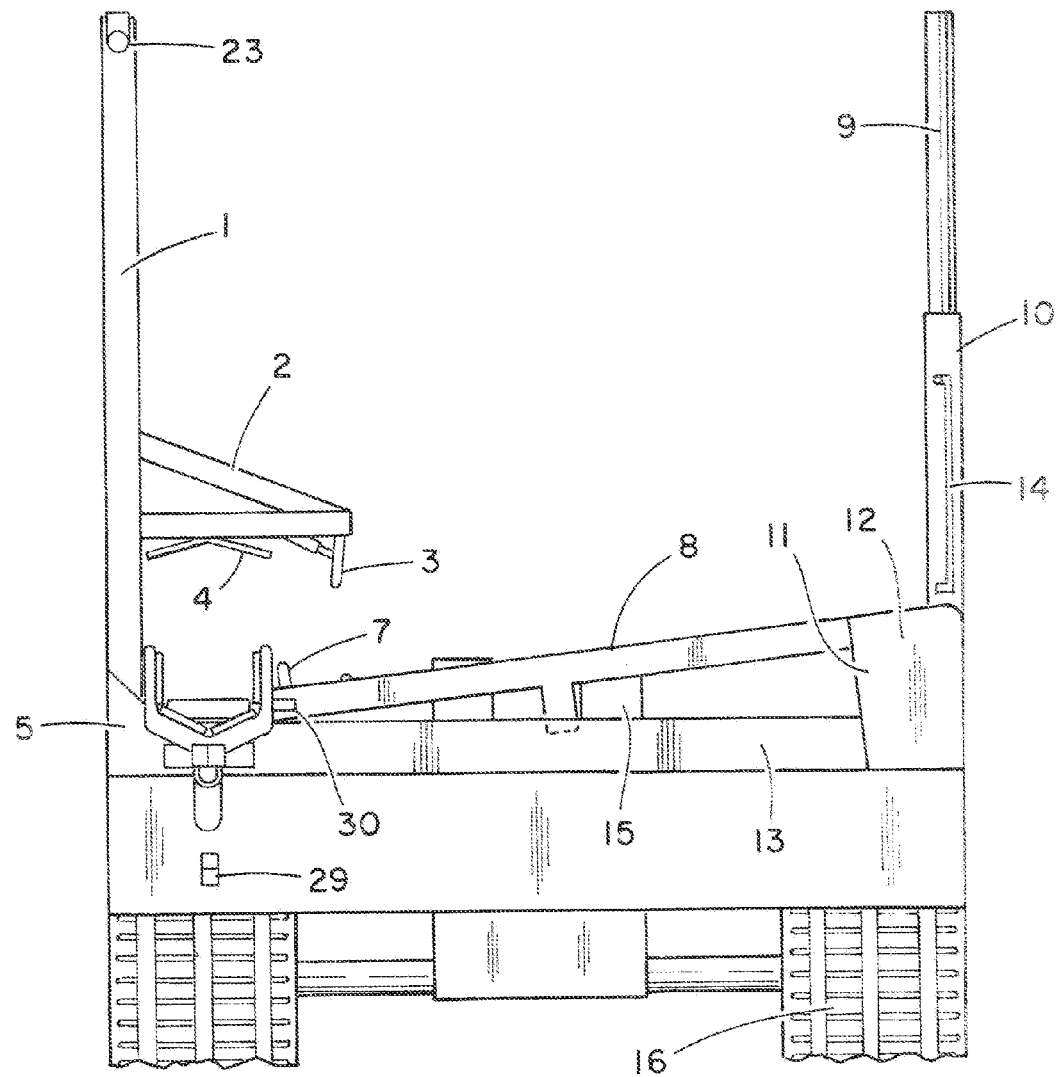
FIG. 4 is a rear view of the stringing trailer.

The pipe segments are first loaded onto the stringing trailer with a forklift or other device that can lift pipe and set it in between a fixed upright 1 and a round insert 9 that extends upward from an upright receiver 10, as shown in FIG. 4. If such a loading device is used, the stringing trailer should preferably be loaded from the side of the round insert 9.

Figure 6:
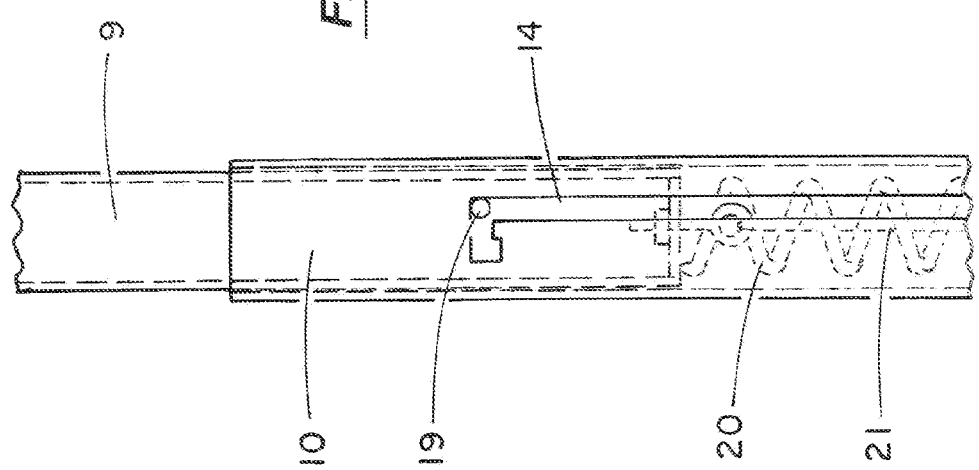
FIG. 6 is a detail view of the connection between an upright receiver 10 and a round insert 9.
Figure 5:
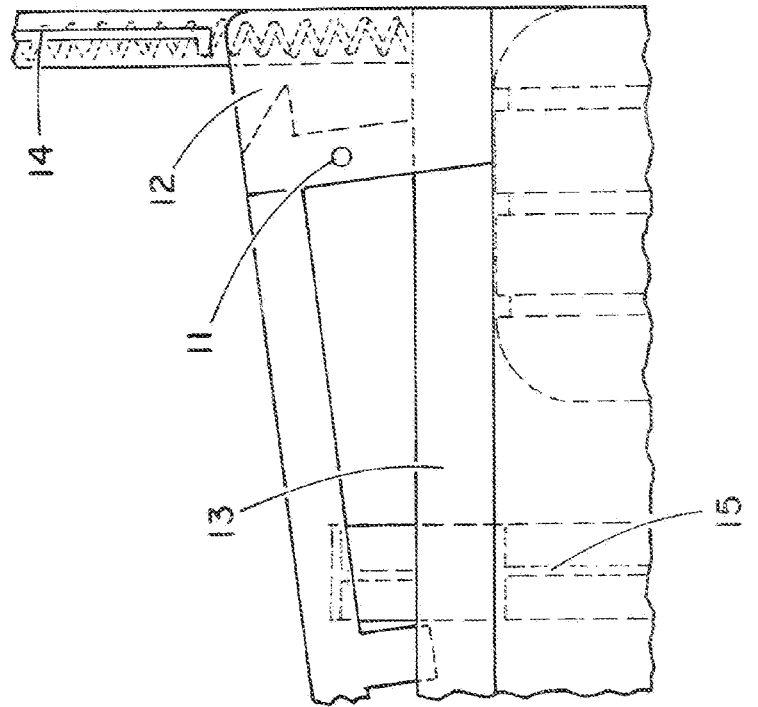
FIG. 5 is a detail view of a portion of one of the upright receivers 10 and pivot plate 12.

FIGS. 5 and 6 provide detail views of the round insert 9 and upright receiver 10. The round insert 9 can slide within the upright receiver 10 between an extended position and a retracted position. The round insert 9 can be lowered into the upright receiver 10 so that when the loading device places the pipe into the stringing trailer it does not drop from a substantial height and damage other parts on the stringing trailer. To lower the round insert 9, a worker places his hand on the receiver slot handle 19 and pulls down and in, to lock the round insert 9 into its lowered position. A spring 20 biases the round insert 9 upward to enable a worker to easily lift the round insert 9 back up into the extended position after the trailer has been loaded about half way. The remaining pipe can then be loaded with the round insert 9 raised.

The upright receiver 10 is welded to a pivot plate 12. The pivot plate 12 is connected to a pivot point 11 so that if a worker attempting to load the stringing trailer with pipe hits either the round insert 9 or the upright receiver 10, the metal will not bend or distort. Instead it will pivot about the pivot point 11 which is a pin that runs through the gravity member 8. The pivot plate 12 is only welded to the upright receiver 10, but it is not welded to the gravity member 8 or base 13. It merely slides along the surface of the two to keep the upright receiver 10 and the round insert 9 from moving from side to side. The spring 20 also keeps the upright receiver 10 and the round insert 9 from falling inward toward the center of the trailer. The spring 20 therefore holds a dual purpose of making it easier for a worker to lift the round insert 9 and also keeping the upright receiver 10 from falling inward toward the trailer. It is the cable 21 which makes this possible. The cable 21 is connected with an eyebolt to the base 13 and the bottom of the round insert 9. When the round insert 9 is in the upright position it pulls the upright receiver down which keeps it in place.

Figure 3:
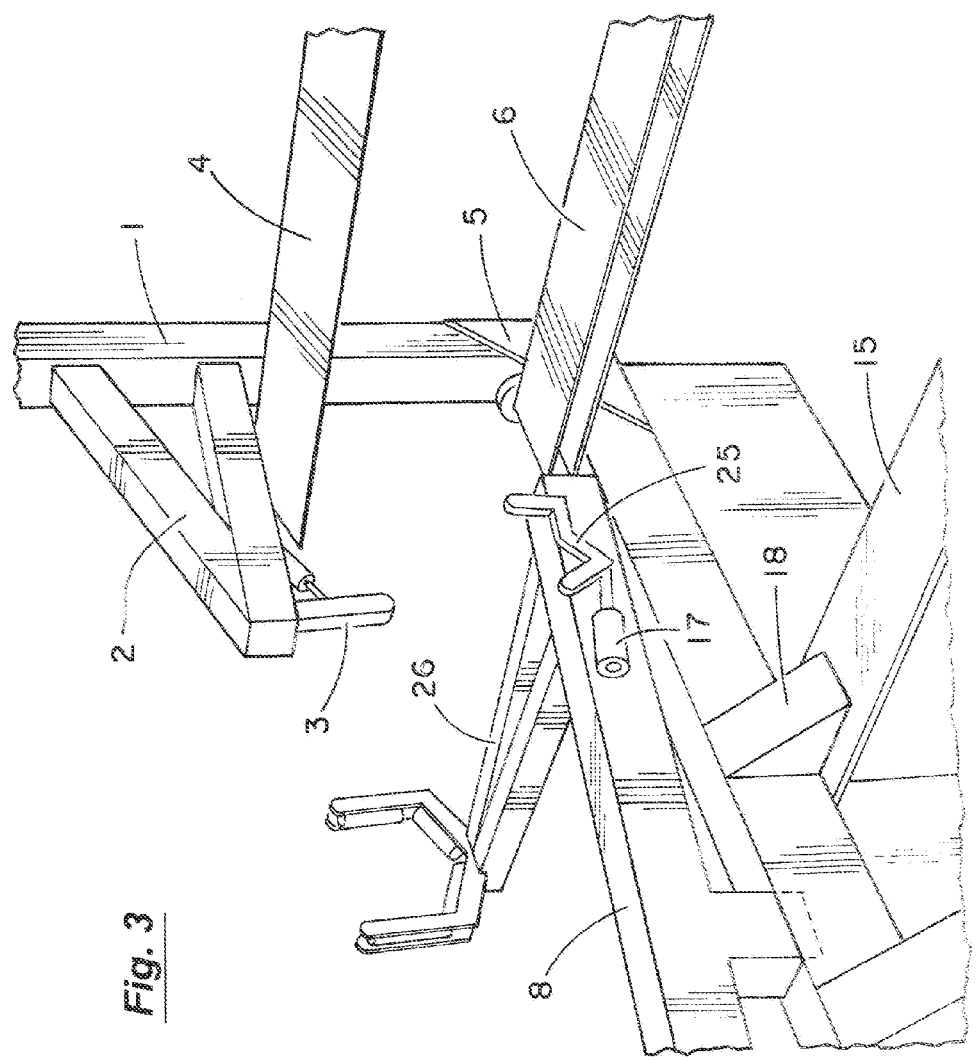
FIG. 3 is a detail perspective view of a portion of the pipe-laying mechanism of the stringing trailer.

FIGS. 3 and 4 illustrate the pipe laying mechanism of the stringing trailer. Any diameter pipe ranging from 4 to 14 in. can be loaded into the stringing trailer as described above. Larger or smaller trailers can be constructed using the present invention for larger or smaller diameter pipe. For example, the entire trailer can be loaded with 6 in. pipe for one load and then 12 in. pipe for another. The trailer cannot be loaded with a mix of different diameter pipe. A few simple adjustments need to be made to the trailer to make it possible to change from one pipe size to another.

A gate arm 3 extends laterally inward from the fixed upright 1 of the trailer above the chute and conveyor 6, as shown in FIGS. 1 and 4. The end of the gate arm 3 defines an opening between the gate arm 3 and the gravity member 8 below that allows only one pipe at a time to enter the conveyor 6. A rocker arm 7 is mounted in this opening to feed a series of pipes (i.e., one at a time) from the bed of the vehicle through the opening and onto the conveyor 6.

To change from one pipe diameter to another, the gate arm 3 can be adjusted up or down and the rocker arm 7 can be adjusted in or out. When the pipe is loaded into the trailer, the tilted gravity members 8 will gravity feed the pipe so that it rolls toward the chute 22. The gate arm 3 is adjusted to be slightly farther away from the gravity member 8 than the diameter pipe used. For example, if 6 in. outside diameter pipe is used then the opening from the gate arm 3 to the gravity member 8 would need to be about 7 in. If a 12 in. outside diameter pipe is used then the gate arm 3 would need to be about 13 in. away from the gravity member 8. Thus, the size of the opening defined between the gravity member 8 and gate arm 3 prevents multiple pipes from entering the chute area 22 and rocker arm 7. In other words, it allows only one pipe at a time to enter the conveyor 6.

The rocker arm 7 is also made from steel or aluminum and can be W-shaped. It is driving by a rocker actuator 17 to pivot back and forth, thereby allowing only one pipe at a time to enter the chute 22 and onto the conveyor belt 6. Preferably, there are four rocker arms 7. One is mounted to each of the gravity members 8 that are part of the assembly 24. They are mounted with a spindle so that they can pivot, thereby allowing one end of the W-shaped rocker arm 7 to rise and then the other in an alternating manner. When one end of each W-shaped rocker arm 7 rises, the other lowers. This allows the rocker arm 7 to stop the next pipe while releasing the one trapped inside the W onto the conveyor belt 6. The rocker arm 7 is adjustable so that the two ends of the W move closer or farther from the center. This is needed to make it work with different size pipes. The adjustment pins 25 make this possible. The two ends of the rocker arm 7 can be made of square metal tubing that slides over the center portion of the rocker arm 7. There are holes in both the center portion and the two ends so that a pin can be entered to secure the ends in a particular distance from the center.

Preferably, there is one rocker actuator 17 for each rocker arm 7 and all of them function in unison. Each rocker actuator 17 is connected to a central control panel situated on the dash of the truck pulling the stringing trailer. The rocker actuator 17 can be automatically activated by this control panel in the cab of the truck. Once a pipe passes a certain point a sensor 30 triggers the rocker actuator 17 to rotate and the next pipe is loaded onto the conveyor belt.

The combination of rocker actuator 17 and rocker arm 7 can be viewed as an actuator mechanism for metering or feeding a series of pipes from the bed of the vehicle through the opening and onto the conveyor 6, and thereby causing the conveyor 6 to lay a string of pipes behind the vehicle as it travels along the ground. It should also be noted that other means could be used to controlling the rate at which pipe are fed onto the conveyor based on the speed of the vehicle. For example, the actuator mechanism could be controlled by speed data from the vehicle's speedometer or sensors detecting rotation of the wheels.

The conveyor belt 6 is attached using three or four rollers mounted to the base 13. The conveyor belt is controlled by another sensor that matches the speed of the trailer and the truck pulling the trailer. This way the pipe exits and lands either on the ground, onto stands, or into the joining trailer 27 so that each pipe is dispersed end to end and there are no gaps or overlap between the pipe. Cameras 23 are mounted in a number of locations to assure the pipe is exiting properly and the stringing trailer is working properly as well. It also helps the driver control the stringing trailer from the cab with override buttons if any of the automatic systems is not functioning properly. One is mounted on the fixed upright 1 and the other is mounted on the headache rack of the truck pulling the trailer.

When a pipe is exiting the rear of the stringing trailed it is helped onto the ground, in stands, or through an optional joining trailer 27 with the transition cradle 26. The transition cradle 26 is comprised of steel or aluminum as well, with 4 castor wheels to help guide the pipe while preventing it from being damaged. There may also be a hydraulic cylinder at the base and the side that allows it to be adjusted up and down or left and right. The driver of the truck can see this transition cradle 26 from a digital screen in the cab and can push a button to make it go up and down or left and right accordingly.

Figure 7:
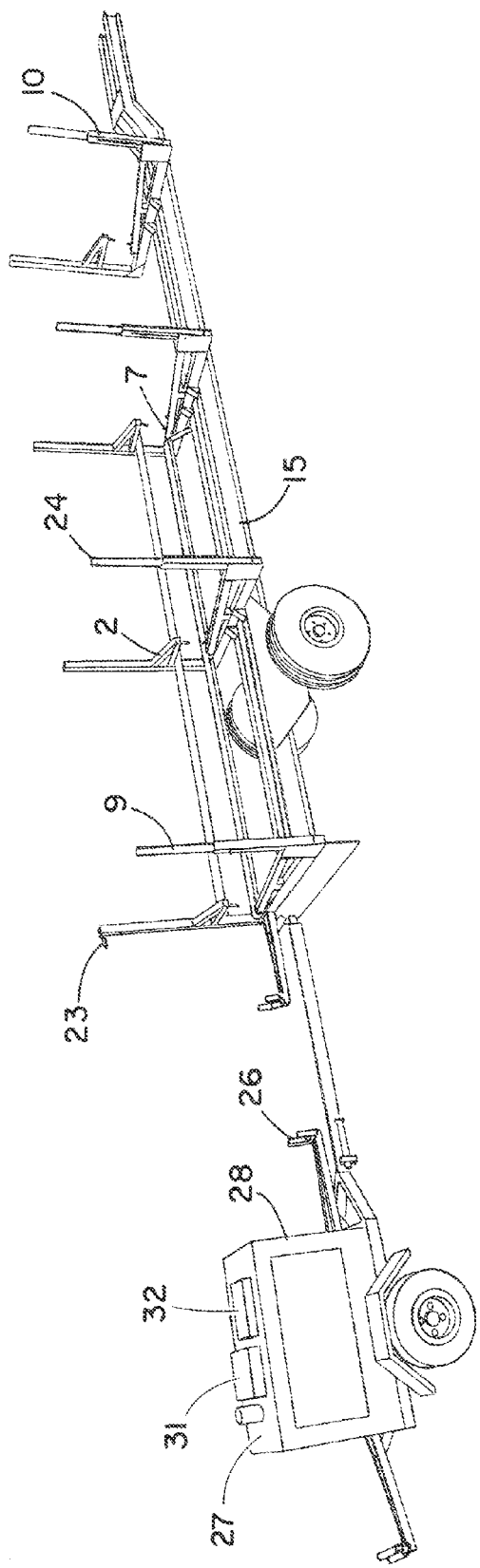
FIG. 7 is a perspective view of the stringing trailer towing a joining trailer 27.
Figure 8:
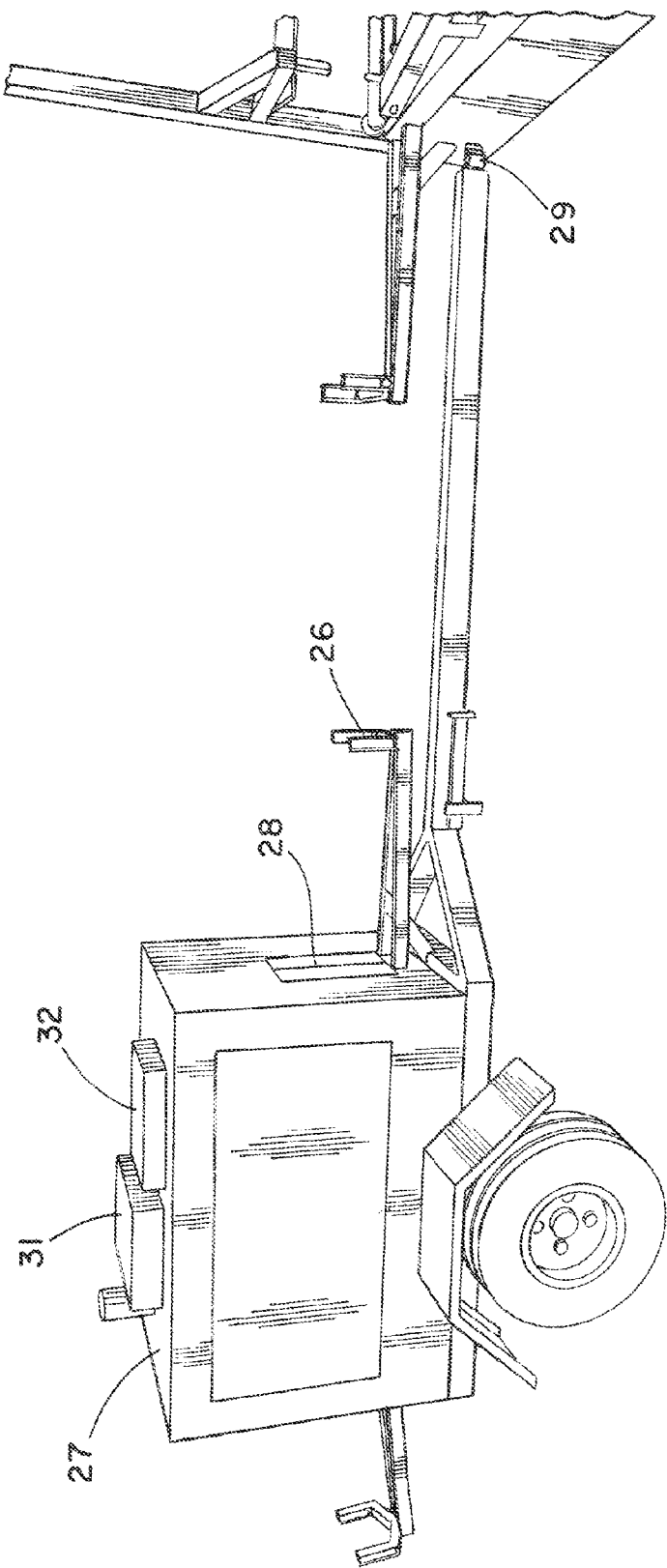
FIG. 8 is a perspective view of the joining trailer 27.

Optionally, a joining trailer 27 can be used in combination with the stringing trailer as shown in FIGS. 7 and 8. The transition cradle 26 guides the pipe into the joining trailer 27. The pipe enters a set of doors 28 where it then can be joined within the joining trailer. The joining trailer is water tight and is built with either steel or aluminum as well. The joining trailer is temperature controlled with a heater and a cooling unit so that it can join pipe in any weather condition. The joining trailer can be connected to the stringing trailer with a pintle hitch 29.

The following is a discussion of the operational steps in using the present invention. The first step in operating the stringing trailer would be to adjust the gate arm 3 so that it is 1 inch plus the diameter of the pipe away from the gravity member 8 directly below. This prevents more than one pipe from entering the chute 22 at a time. The second step before loading the pipe would be to adjust the rocker arm 7 so that the two ends are the correct distance apart to keep one pipe in position while the other is being released into the chute 22. Next the round insert 9 should be lowered by grabbing the receiver slot handle and pulling down, thereby locking it into place where the receiver slot 14 is cut out into a J-shape at the bottom. Once the pipe is gently loaded up to the top of the upright receiver 10, the receiver slot handle 19 can then be raised again and locked into place in the upright position for further loading. The pipe can then continue to be loaded to the top of the round insert 9. Once the pipe is loaded, the rocker arm 7 can be activated by the driver in the truck cab to allow one of the pipes to roll onto the conveyor belt. The next pipe in line will be stopped by the rocker arm 7. As the truck and trailer move, the pipe is pushed out the back of the trailer on the conveyor belt at the same speed. As the pipe is exiting the chute 22 it will start to drop at its half-way point due to gravity. The transition cradle 26 can be raised or lowered by the driver in order to help the pipe find the desired path. A shroud 4 is provided at the top of the chute 22 so that if the pipe tips, it will hit the shroud 4 at the top and follow the V-shape of the shroud 4 until it exits the trailer completely. The V-shape of the shroud 4 helps keep the pipe in line as it exits the chute 22. Once the first pipe reaches a certain point, a sensor 30 actuates the rocker arm automatically and the next pipe drops into place. Alternatively, the rocker arm can be actuated at the driver's discretion by operation of a joystick, electrical switch, or other manual control. The speed at which the pipe exits the stringing trailer depends on the speed at which the driver is driving because the speed of the conveyor belt is regulated by a signal from a computer in the cab of the truck, or by the driver's manual control. If, for example, the truck is driving 5 MPH then the pipe will exit the stringing trailer at or around 5 MPH. This process is repeated until all of the pipe has exited the trailer and the driver returns to load more pipe. If there are any problems during the offloading of the pipe, the driver will be able to see because of the cameras 23 mounted on the fixed upright 1 and the headache rack of the truck.

The following is a discussion of the steps involved in fabricating the present invention. First, a trailer or other vehicle should be obtained having a bed that is flat for the length of the pipe that is being carried. The fixed upright 1 is then cut and welded to the base 13. Next, the gravity member 8 with its supports is welded to the base 13. The round insert 9 is then cut to length, and it would need to be the correct diameter in order to fit snuggly into the upright receiver 10. The upright receiver 10 is then cut to length, and also the receiver slot 14 is cut into the upright receiver 10. The top and bottom of the round insert 9 should be welded shut so that the elements would not enter from the top and so that the spring 20 could push against the bottom. A hole is drilled in the bottom plate that was welded onto the round insert 9 so that an eyebolt can be attached and the cable 21 can be attached to the eyebolt. A hole is also drilled into the top of the base 13 directly in the center of where the upright receiver 10 is sitting. This hole, like the one previously mentioned, would be for a second eye bolt and would be used to attach the other end of the cable 21. The bottom of the upright receiver 10 should be welded shut so that the spring inside could push against it and give the required tension. The pivot plate 12 is then welded to the upright receiver 10 and holes are drilled into it and the gravity member to allow for a spindle to be inserted which would allow it pivot if it were struck by a loader accidentally from the outside. For example, the gravity members 8 can be tilted bars extending across the bed of the vehicle, as shown in FIGS. 1 and 4. Each gravity member 8 can be a bar cut at a radius to allow for the travel of the upright receiver 10 and then filled in with steel welded. The portion 2 of the gate arm 3 extending over the chute 22 can be fabricated leaving a hole in the bottom for the swing arm that extends downward from the distal end of the gate arm 3.

The support plates 5 are then welded to the sides of the base 13 and the fixed upright 1. Each of the conveyor belt castors 6 are then welded to each base. The rocker arm 7 is welded together with steel or aluminum square tube in a W-shape and then fixed to the gravity member 8 with a spindle to allow it to pivot. Once all of the assemblies are welded together they can then be attached to the trailer at equal distances depending on the length of the trailer and the length of the pipe used. Each of these should be supported with a base support 18 which is essentially a triangle welded to both the trailer frame 15 and the assembly 24. Once all of the assemblies 24 are connected to the trailer frame 15, the conveyor belt can be attached to the conveyor belt castors 6. The shroud 4 can also be attached to the chute arm 2 by welding it below. The transition cradle 26 is then fitted with castor wheels and attached to the trailer frame 15 and the assembly with a hinge near the top and a hydraulic cylinder below and to the side. The camera 23 is then attached to the top of the fixed upright and wired to the screen in the cab. The hydraulics are then attached to work the transition cradle 26 and the rocker actuator 17 that rotates the rocker arm 7.

The same result can be reached if this design did not have the pivot plate 11 with the round insert 9. These added items prevent accidents from occurring and damage to the trailer. The trailer would continue to function without these added features. The trailer will also function without the transition cradle 26 as well. The transition cradle 26 helps with control and prevents wear and tear on the trailer. The big wheels on the trailer set this trailer apart from others because it allows it to function in rough terrain but they would not need to be so big if pipe needed to be laid in a very flat area.

The preceding discussion has focused on an embodiment of the present invention as a stringing trailer. It should be understood that the present invention could be installed in the bed of a truck, or moved by a tractor or any other suitable vehicle. Therefore, the term "vehicle" should be broadly construed to cover any of these embodiment of the present invention.

The optional joining trailer 27 can be made with steel or aluminum and could use a basic trailer frame with shocks and wheels 16. The wheels 16 should be off-road and wide like the stringing trailer so that it can function in rough terrain. The box unit on top can be made from fiberglass reinforced with a steel or aluminum frame from inside. A portable heater 31 and air conditioner 32 can be affixed to the ceiling of the joining trailer just as they would on a camper.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. An automated system for laying a plurality of pipes comprising:
    a vehicle with a bed for storing the plurality of pipes;
    a conveyor running toward the rear of the bed of the vehicle;
    tilted gravity members defining at least a portion of the bed and extending across the vehicle for feeding pipes toward the conveyor;
    an opening defined between each of axially spaced gate arms and the gravity members, the opening sized to allow one pipe at a time to enter the conveyor;
    said gate arms being adjustable to vary a size of the opening;
    an actuator mechanism which feeds the plurality of pipes from the bed of the vehicle through the opening and onto the conveyor, thereby causing the conveyor to lay the plurality pipes in series behind the vehicle, said actuator mechanism being movable independently of said gate arms.

2. The system of claim 1 wherein the gate arms are adjustably mounted to adjust the opening to accommodate different pipe diameters.

3. The system of claim 1 wherein the actuator mechanism further comprises a rocker arm pivoting to feed one pipe at a time onto the conveyor.

4. The system of claim 3 wherein the rocker arm is W-shaped.

5. The system of claim 1 wherein the tilted gravity members comprise a plurality of tilted bars extending across the bed of the vehicle.

6. The system of claim 1 further comprising a transition cradle behind the conveyor for guiding and supporting the pipes exiting the conveyor.

7. A automated system for laying a plurality of pipes comprising:
    a vehicle with a bed for storing the plurality of pipes; a conveyor running toward the rear of the bed of the vehicle;
    tilted gravity members extending across the bed of the vehicle for feeding pipes toward the conveyor;
    gate arms extending above the conveyor to define an opening between the gate arms and the gravity members, said gate arms being adjustable to vary a size of the opening; and,
    an actuator mechanism with a rocker arm in the opening feeding the pipes from the bed of the vehicle through the opening and onto the conveyor allowing one of the pipes at a time to enter the conveyor, said rocker arm operating independently of said gate arms, thereby causing the conveyor to lay the plurality of pipes in series behind the vehicle.

8. The system of claim 7 wherein the gate arms are adjustably mounted to adjust the opening to accommodate different pipe diameters.

9. The system of claim 7 wherein the rocker arm is W-shaped.

10. The system of claim 7 wherein the tilted gravity members comprise a plurality of tilted bars extending across the bed of the vehicle.

11. The system of claim 7 further comprising a transition cradle behind the conveyor for guiding and supporting the pipes exiting the conveyor.

* * * * *